Sept. 18, 1951   C. F. TOTHEROH   2,568,669
INFLATABLE COVERING FOR SURFACES
Filed Jan. 23, 1948
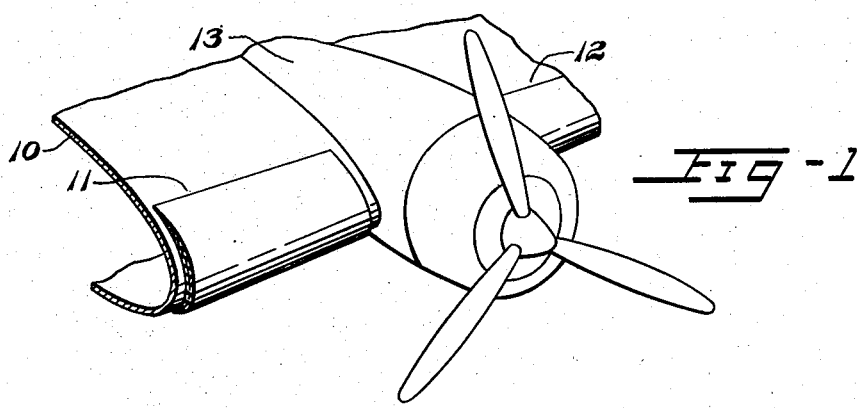
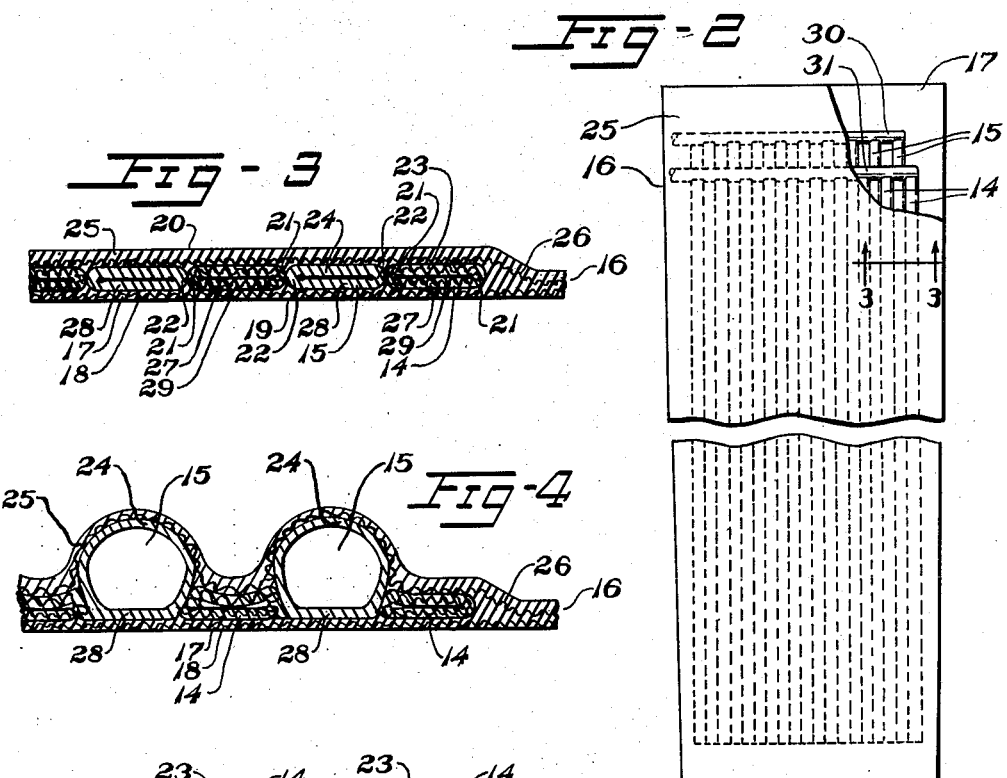
Inventor
Charles F. Totheroh
By
Atty Patented Sept. 18, 1951

2,568,669

UNITED STATES PATENT OFFICE 2,568,669

INFLATABLE COVERING FOR SURFACES

Charles F. Totheroh, Copley, Ohio, assignor to
The B. F. Goodrich Company, New York, N. Y.,
a corporation of New York Application January 23, 1948, Serial No. 3,946

6 Claims. (Cl. 244—134)

1

The invention relates to apparatus for preventing the accumulation of ice upon surfaces exposed to ice-forming conditions and especially to inflatable protective coverings for the wings and other airfoils and surfaces of aircraft.

Objects of the invention are to provide an improved protective covering utilizing a series of inflatable tubes or passages side-by-side; to provide for lateral distention of a tube to a position substantially overlapping the position of an adjacent uninflated tube; to provide effectively for ice-removal at the zones between adjacent inflatable tubes; to provide for a covering having two sets of tubes arranged in alternation one of which sets has tubes of limited distensibility and the other set has tubes of extensive distensibility; and to provide for maintaining strength and durabilty of the construction while under repeated high inflation pressures and especially to provide an arrangement of parts such as to minimize the tendency of rupturing and separation of parts of the structure as a result of high inflation pressures.

These and other objects and advantages of the invention will be apparent from the following description.

In the drawings which form a part of this specification and in which like numerals are employed to designate like parts throughout the same, Fig. 1 is a perspective view from above of coverings on the leading edge of an aircraft wing constructed in accordance with and embodying the invention, parts being broken away and in section, Fig. 2 is a plan view from above of a covering before attachment to the wing, parts being broken away, Fig. 3 is a section taken along line 3—3 of Fig. 2, parts being broken away, Fig. 4 is a view like Fig. 3 but showing one set of alternate tubes in the inflated condition, and Fig. 5 is a view like Fig. 3 but showing the intervening alternate tubes in the inflated condition.

The covering construction shown in the drawings is adapted to be mounted on the leading edge of an aircraft wing 10 or other airfoil or surface exposed to ice-forming conditions and at the desired locations such, for example, as the inboard 11 and outboard 12 sides of an engine nacelle 13. Each covering may be marginally attached, but is preferably attached adhesively to provide an all-over, cemented-down attachment, thereby making feasible a thin construc-

2 tion presenting minimum disturbance to airflow and having minimum weight.

The coverings at 11 and 12 being substantially identical in construction, only the construction shown at 11 will be described in detail. The covering at 11 has a body 16 of resilient rubber or other rubber-like material including an inner wall or sheet backing 17 having desirably a reinforcement 18 of relatively non-stretchable, woven textile fabric of nylon or other suitable filamentary material disposed adjacent the inner surface 19 of the covering. The covering has a thin, outer wall 25 of the resilient rubber-like material of substantially uniform thickness, as shown especially in Fig. 3, to facilitate substantially uniform stretching of the outer wall 25 under inflation of the covering, and desirably includes a highly stretchable reinforcement 26 disposed adjacent the outer surface 20, which reinforcement may be stockinette or other elastic knitted or woven material such as bias-laid, open-mesh fabric of nylon.

Two sets of inflatable passages or tubes 14, 14 and 15, 15 arranged in alternation are disposed in the body 16 in side-by-side relation with the margins of adjacent tubes desirably in contact with one another in the ininflated condition of the tubes. While the tubes may extend in the chordwise or other direction of the covering, it is preferred that the tubes extend spanwise and be arranged in series chordwise of the covering as shown in the drawings.

In accordance with the invention, the alternate tubes 15, 15 are extensively distensible, and preferably have walls of resilient rubber-like material without stretch-resisting reinforcement. Each all-rubber tube 15, under inflation, outwardly bulges the covering not only between but also beyond its margins 22, 22 which are laterally distended in overlapping relation to the position of the adjacent uninflated tube 14, as shown in Fig. 4; whereby the ice-deposit overlying the zones between adjacent tubes 14, 15 and also intermediate the margins of the tube 15 is broken and loosened for removal by the scavenging action of the flow of air across the covering. The outer wall 25 including its reinforcement 26 being elastic does not objectionably resist the distention of the tube 15.

The all-rubber wall of the tube 15 even though in fixed attachment to the backing material 17 entirely across its base or inner circumferential portion 28 makes feasible extensive circumferential stretching of the tube and extensive lateral stretching of the outer wall 25, in addition to substantial lateral distention of the margins 22, 22 in the aforesaid overlapping relation to the positions of the adjacent tubes 14, 14. It has been found that, despite repetitive inflation of the tube 15, objectionable separation of its margins from the underlying backing 17 does not occur. It has also been found that the margins 22, 22 stretch laterally with little or no lifting effect upon the adjacent uninflated tubes 14, 14, especially when the covering is adhesively attached to the wing 10.

The intervening alternate tubes 14, 14 need not be extensively distensible, and each desirably includes in its wall of resilient rubber-like material a stretch-resisting reinforcement 29, preferably of nylon fabric, which may be continuously annular and may have some extensibility. The reinforcement 29 functions to limit the distensibility of each tube 14 and offers strength to resist blowout of the tubes under high inflation pressures and during inflation of both sets of tubes, the reinforcement in effect strengthening the adjacent marginal walls of adjacent tubes 14 and 15. Each tube 14 at its base or inner circumferential portion 27 is fixedly attached to the backing 17 entirely across the width of the tube between the margins 21, 21 thereof. When inflated, each tube 14 tends to assume a flattened semi-circular shape substantially as shown in Fig. 5, there being little or no lateral distention of the margins 21, 21.

The advantages of the construction described hereinbefore may be obtained with inflatable tubes of small width as well as tubes of large width, good results having been obtained especially in the case of small tubes under about ¾ of an inch in width.

The fabric and rubber parts of the covering are desirably integrally united as by vulcanization under heat and pressure thus assuring good attachment of the tubes in the covering, especially across their bases and at the abutting margins of adjacent tubes. The hereinabove described construction makes feasible good bonding with little or no danger of forming objectionable pockets of air at the juncture of adjacent tubes under the vulcanization.

The set of all-rubber tubes 15, 15 extending spanwise may be in communication with an inflating manifold 30 extending chordwise at one end of the covering and the other set of fabric reinforced tubes 14, 14 may be in communication with a chordwise extending inflating manifold 31 at the same end of the covering as shown in Fig. 2. The manifolds 30, 31 are connected to a suitable source of air under pressure and suitable valve means (not shown) in the aircraft structure, whereby the respective sets of inflatable tubes 14, 14 and 15, 15 are inflated in alternation. Such inflation effects the desired bulging and lateral distention of the tubes 15, 15 in overlapping relation to the positions of the uninflated tubes 14, 14 during one phase of the inflation cycle, and effects distention of the tubes 14, 14 to substantially the rounded shapes shown in Fig. 5 during the other phase of the inflation cycle, thereby effectively removing the ice deposited on the covering including the ice overlying the joints between adjacent tubes.

Variations may be made without departing from the scope of the invention as it is defined in the following claims.

I claim:

1. Apparatus for preventing the accumulation of ice upon a surface exposed to ice-forming conditions, said apparatus comprising a covering for said surface having walls therein defining a pair of alternately inflatable passages in side-by-side relation upon underlying material of the covering with adjacent marginal wall portions of the passages directly along side one another and joined together to provide a unitary wall between said passages, one of said marginal wall portions between the passages comprising extensible rubber material without extension-limiting reinforcement therein which rubber material also extends about the outer wall portion of one of said passages for extensive inflation of the passage to dispose the outer wall portion in overlapping relation to the margin of the uninflated other passage, and the other marginal wall portion between the passages comprising material relatively inextensible which material also extends about the outer wall portion of said other passage for restricting inflation of the passage to a width no greater than the width of the uninflated passage and for reinforcing both said marginal wall portions between said passages against rupture, while permitting the relatively greater distension of the first said passage, said extensible rubber material and the relatively inextensible material of said marginal wall portions being integrally united with one another and with said underlying material of the covering across and between said passages, and conduit means in said covering individual to each of said passages for conducting inflating medium to inflate said passages alternately.

2. Apparatus for preventing the accumulation of ice upon a surface exposed to ice-forming conditions, said apparatus comprising a covering comprising resilient rubber material for said surface having therein a pair of alternately inflatable tubes disposed beneath overlying resilient rubber material of the covering of substantially uniform stretchability and disposed in side-by-side relation upon underlying material of the covering with adjacent margins of the tubes adjoining one another in united relation one to the other, the wall of one of said tubes consisting of resilient rubber material for extensible inflation of the tube to dispose the outer wall portion thereof in overlapping relation to the position of the uninflated other tube, the wall of said other tube comprising material of less extensibility than the wall of the first said tube for restricting inflation of said other tube to a width no greater than that of the uninflated tube and by virtue of the united relation of the tube for reinforcing the walls of said tubes against rupture at said adjacent margins thereof, while permitting the relatively greater distension of the first said tube, said resilient rubber material and the less extensible material of said walls being integrally united with one another at said adjacent margins and with said overlying resilient material and said underlying material across and between said tubes, and conduit means in said covering individual to each of said tubes for conducting inflating medium to inflate said tubes alternately.

3. In an airfoil protective covering, in combination, a body of resilient rubber-like material, a plurality of inflatable tubes of substantially uniform diameter extending beneath the outer surface of said body and disposed upon underlying material of said body, said outer surface comprising resilient rubber-like material of substantially uniform stretchability having therein a reinforcement of highly stretchable textile fabric sheet material overlying said tubes in united relation therewith, said tubes being disposed in side-by-side relation with adjacent margins of adjacent tubes directly along side one another in united relation one to the other and being disposed in sets of tubes arranged in alternation and alternately inflatable, the walls of one set of tubes consisting of resilient rubber-like material for extensive inflation of such tubes to dispose the outer wall portions thereof in overlapping relation to the margins of the uninflated adjacent tubes of the other set thereof, the walls of said other set of tubes comprising continuous annular textile fabric material relatively inextensible as compared to the walls of the first set of tubes for restricting inflation of each tube of said other set to a width no greater than the width of the uninflated tube and by virtue of the united relation of the tubes for reinforcing the walls of the tubes of both sets against rupture at their adjacent margins, while permitting the relatively greater distension of the tubes of the first said set, said rubber-like material and said fabric material of said walls being integrally united with one another at said adjacent margins and with the reinforced rubber-like material of said outer surface and with said underlying material across and between said tubes, and individual conduits in said covering each in communication with the tubes of one of said sets for conducting inflating medium to inflate said sets of tubes in alternation.

4. Apparatus for preventing the accumulation of ice on the leading edge of an airfoil, said apparatus comprising a body of resilient rubber-like material having therein a first set of inflatable tubes and a second set of inflatable tubes inflatable as a set in alternation with said first set of tubes and alternately positioned between the tubes of said first set with margins of the tubes of one set adjoining margins of the tubes of the other set and united therewith, the attached margins of the adjoining tubes being united with underlying material of said body across and between the tubes and with outer wall portions of the tubes, the tubes of said first set comprising resilient rubber-like material with a reinforcement of stretch-resisting material therein extending about the margins and also about the outer wall portions of the tubes and limiting expansibility of the tubes, and the tubes of said second set comprising resilient rubber-like material without such reinforcement therein and being thereby expansible to a relatively great extent as compared to that of the tubes of said first set, while the margins of the tubes of said second set are strengthened against rupture by said reinforcement in the attached margins of the adjoining tubes, and conduit means in said covering individual to each of said sets of tubes for conducting inflating medium to inflate said first set of tubes in alternation with said second set of tubes.

5. Apparatus for preventing the accumulation of ice on the leading edge of an airfoil, said apparatus comprising a body of resilient rubber material having therein a first set of inflatable tubes and a second set of inflatable tubes inflatable as a set in alternation with said first set of tubes and alternately positioned between the tubes of said first set with margins of the tubes of one set adjoining margins of the tubes of the other set and united therewith, said first and said second set of inflatable tubes being disposed upon underlying material of said body and beneath overlying resilient rubber material of said body of substantially uniform stretchability, the attached margins of the adjoining tubes being united with said underlying material of said body across and between the tubes and with said overlying material of said body, the tubes of said first set comprising resilient rubber with a reinforcement of stretch-resisting fabric material therein extending about the margins and also about the outer wall portions of the tubes for restricting inflation of each of the tubes to a width no greater than that of the uninflated tube, the tubes of said second set comprising resilient rubber material without such fabric reinforcement therein and being thereby inflatable to an extent such as to dispose the outer wall portions of the tubes in overlapping relation to the positions of the uninflated tubes of said first set, while the margins of the tubes of said second set are strengthened against rupture by the fabric in the attached margins of the adjoining tubes, and conduit means in said covering individual to each of said sets of tubes for conducting inflating medium to inflate said first set of tubes in alternation with said second set of tubes.

6. Apparatus for preventing the accumulation of ice on the leading edge of an airfoil, said apparatus comprising a first set of inflatable tubes and a second set of inflatable tubes inflatable as a set in alternation with said first set of tubes and alternately positioned between the tubes of said first set with margins of the tubes of one set adjoining margins of the tubes of the other set and united therewith, both sets of tubes being of substantially uniform diameter, an outer sheet comprising resilient rubber of substantially uniform stretchability having a sheet of elastic textile fabric therein overlying both sets of tubes, an inner sheet of resilient rubber underlying both sets of tubes, the outer and inner sheets of resilient rubber extending across and between said tubes in united relation therewith including the attached margins thereof, the tubes of said first set comprising resilient rubber and a continuous annular reinforcement of stretch-resisting textile fabric material therein restricting inflation of each of the tubes to a width no greater than that of the uninflated tube, the tubes of said second set comprising resilient rubber without such annular fabric reinforcement therein and being thereby inflatable to an extent such as to dispose the outer wall portions of the tubes in overlapping relation to the margins of the uninflated tubes of said first set, while the margins of the tubes of said second set are strengthened against rupture by the fabric in the attached margins of the adjoining tubes, and a pair of tubular manifolds in said covering each in communication with the tubes of one of said sets for conducting inflating medium to inflate said first set of tubes in alternation with said second set of tubes.

CHARLES F. TOTHEROH.

REFERENCES CITED

The following references are of record in the file of this patent:

UNITED STATES PATENTS

| Number | Name | Date |
| --- | --- | --- |
| 1,998,809 | Geer | Apr. 25, 1935 |
| 2,271,760 | Colley | Feb. 3, 1942 |
| 2,436,889 | Heston | Mar. 2, 1948 |
| 2,440,533 | Antonson | Apr. 27, 1948 |